United States Patent
Chavan

(10) Patent No.: US 10,821,343 B1
(45) Date of Patent: Nov. 3, 2020

(54) THERMOCHROMIC GOLF CLUB GRIP

(71) Applicant: Callaway Golf Company, Carlsbad, CA (US)

(72) Inventor: Vijay Chavan, Vista, CA (US)

(73) Assignee: Callaway Golf Company, Carlsbad, CA (US)

( * ) Notice: Subject to any disclaimer, the term of this patent is extended or adjusted under 35 U.S.C. 154(b) by 0 days.

(21) Appl. No.: 16/680,261

(22) Filed: Nov. 11, 2019

Related U.S. Application Data

(60) Provisional application No. 62/767,677, filed on Nov. 15, 2018.

(51) Int. Cl.
| | |
|---|---|
| *A63B 53/14* | (2015.01) |
| *A63B 60/08* | (2015.01) |
| *A63B 60/10* | (2015.01) |
| *B32B 15/06* | (2006.01) |
| *A63B 71/06* | (2006.01) |

(52) U.S. Cl.
CPC .............. *A63B 60/08* (2015.10); *A63B 60/10* (2015.10); *A63B 71/0622* (2013.01); *B32B 15/06* (2013.01); *A63B 2071/0694* (2013.01); *B32B 2255/10* (2013.01)

(58) Field of Classification Search
CPC ..... A63B 60/08; A63B 60/10; A63B 71/0622; A63B 2071/0694; A63B 53/14; A63B 60/14; B32B 15/06; B32B 2255/10
See application file for complete search history.

(56) References Cited

U.S. PATENT DOCUMENTS

| | | | | |
|---|---|---|---|---|
| 4,597,578 A | * | 7/1986 | Lancaster | A63B 60/16 473/300 |
| 5,194,183 A | * | 3/1993 | Munch | C09D 5/26 252/299.01 |
| 5,219,625 A | * | 6/1993 | Matsunami | A63H 3/36 349/199 |
| 5,302,440 A | * | 4/1994 | Davis | B05D 7/12 428/195.1 |
| 5,350,633 A | * | 9/1994 | Sumii | B41M 5/284 106/31.17 |
| 5,352,649 A | * | 10/1994 | Shibahashi | A61K 8/02 101/491 |
| 6,228,804 B1 | * | 5/2001 | Nakashima | C09K 9/02 503/201 |
| 8,334,337 B2 | * | 12/2012 | Lamkin | C08L 23/16 524/502 |
| 8,470,910 B2 | * | 6/2013 | Fasano | C09D 167/08 523/218 |
| 8,801,530 B2 | * | 8/2014 | Beck | A63B 71/0622 473/201 |
| 9,737,777 B2 | * | 8/2017 | April | G06F 1/1626 |
| 9,738,059 B2 | * | 8/2017 | Hing | A63B 71/0054 |
| 10,086,225 B2 | * | 10/2018 | Sheppard | A63B 21/0722 |

(Continued)

FOREIGN PATENT DOCUMENTS

| | | | | |
|---|---|---|---|---|
| EP | 3561013 A1 | * | 10/2019 | B32B 27/08 |
| KR | 20150035302 A | * | 4/2015 | |

*Primary Examiner* — Stephen L Blau
(74) *Attorney, Agent, or Firm* — Michael A. Catania; Rebecca Hanovice; Sonia Lari

(57) ABSTRACT

A grip for a golf club is disclosed herein. The grip comprises an inner layer, an outer layer, a primer layer and a topcoat layer. At least one layer comprises a thermochromic pigment or a thermochromic paint.

4 Claims, 3 Drawing Sheets

(56) References Cited

U.S. PATENT DOCUMENTS

| | | | |
|---|---|---|---|
| 2005/0111177 A1* | 5/2005 | Kwitek | G06F 1/1616 |
| | | | 361/679.19 |
| 2013/0166405 A1* | 6/2013 | Mitzel | A63B 60/62 |
| | | | 705/26.5 |
| 2014/0137349 A1* | 5/2014 | Newman | A46B 9/04 |
| | | | 15/143.1 |
| 2018/0142141 A1* | 5/2018 | Xiao | B26B 21/4012 |
| 2019/0225725 A1* | 7/2019 | Shigeta | C08K 7/00 |
| 2019/0336834 A1* | 11/2019 | Greaney | A63B 71/0619 |

\* cited by examiner

THERMOCHROMIC GOLF CLUB GRIP

CROSS REFERENCES TO RELATED APPLICATIONS

The Present Application claims priority to U.S. Provisional Patent Application No. 62/767,677, filed on Nov. 15, 2018, which is hereby incorporated by reference in its entirety.

STATEMENT REGARDING FEDERALLY SPONSORED RESEARCH OR DEVELOPMENT

Not Applicable

BACKGROUND OF THE INVENTION

Field of the Invention

The present invention relates to golf club grips.

Description of the Related Art

A golf club grip ("GCG") is an important part of a golf club that helps golfer hit a ball with accuracy. A good golf grip that fits the golfer's hands well helps him/her drive, spin, and putt the ball better. A large number of golfers struggle to hold the grip right way and hence do not achieve desired results during a typical round of golf. There remains a need to give golfer a quick visual feedback regarding how he/she is holding the club without having an external observer such as golf coach.

U.S. Pat. No. 8,801,530 discloses the use of color changing substrates, possibly adhesive backed tape with hand placement indicators. The invention disclosed uses no hand placement indicators or tape. It uses thermochromic pigments or dyes in the rubber, paint or ink used in making a GCG. When used in rubber for a GCG, the thermochromic pigment is compounded with other additives. When used in paint, the thermochromic pigment/dye is dissolved/dispersed in paint. This paint is then applied to the GCG. Grip described in this invention may have one, two or more layers of rubber. This rubber is typically cured by use of peroxides or sulfur based curing agents. Paints used can be water or solvent based. They can be cured by heat, UV light, or air drying.

BRIEF SUMMARY OF THE INVENTION

One aspect of the present invention is a grip for a golf club. The grip comprises an inner layer, an outer layer, a primer layer and a topcoat layer. At least one layer comprises a thermochromic pigment or a thermochromic paint.

Another aspect of the present invention is a grip comprising an inner layer, an outer layer, a primer layer, and a topcoat layer. At least one layer comprises a thermochromic pigment or a thermochromic paint.

Yet another aspect of the present invention is a grip comprising at least one layer comprising a thermochromic pigment or a thermochromic paint.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
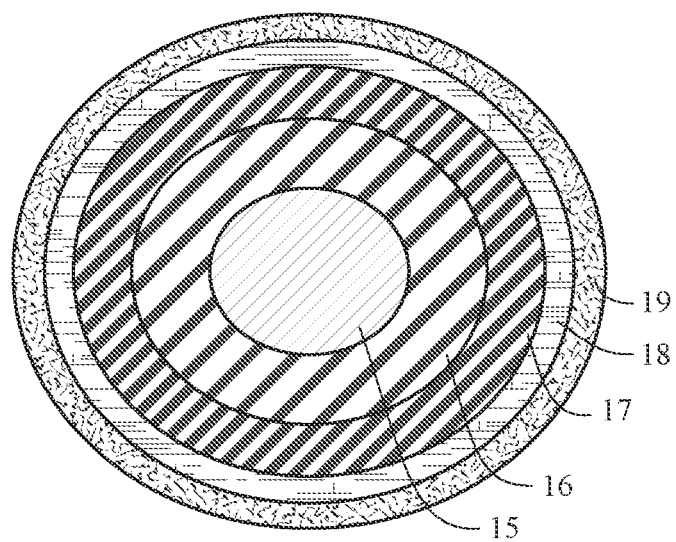
FIG. 1 is a cross-sectional view of a golf club grip with a steel or graphite shaft, an inner layer of the grip made of rubber, an outer layer of the grip made of rubber, a primer layer of paint applied to the grip, and a topcoat layer of paint.

One embodiment of the present invention is to impart a visual impression of hands on a GCG by incorporating thermochromic pigments in the first layer of rubber, thermoplastic, or thermoset used in making GCG.

Another embodiment of the present invention is to impart a visual impression of hands on a GCG by incorporating thermochromic pigments in the second layer of rubber, thermoplastic, or thermoset used in making GCG.

Another embodiment of the present invention is to impart a visual impression of hands on a GCG by incorporating thermochromic pigments in the primer layer of paint used for painting last layer of GCG.

Another embodiment of the present invention is to impart a visual impression of hands on a GCG by incorporating thermochromic pigments in the topcoat layer of paint used on the primer layer.

Another embodiment of the present invention is to impart a visual impression of hands on a GCG by incorporating thermochromic pigments in the ink used on the grip to print company logos, company symbols, desired text. This ink is applied to any of the rubber, primer, or topcoat layers.

Another embodiment of the present invention is to impart a visual impression of hands on a GCG by incorporating thermochromic pigments in any combination of the first grip layer, second grip layer, primer layer, topcoat and ink.

The flowing raw materials are used for making the grip of the present invention.

Thermochromic pigment—This pigment changes color upon exposure to certain temperature. This temperature can range from 0 Celsius (32 F) to 50 Celsius (122 F). Color change can occur from one color to another color. It can also occur from one color to colorless. This change is preferably reversible.

Rubber, thermoplastic, or thermoset resin—Rubber used in making such grip can include but is not limited to one or mixture of the following rubbers: polybutadiene, polyisoprene, silicone, EPDM, polyurethane, and acrylonitrile butadiene rubber (NBR). These rubbers are usually crosslinked using peroxides or sulfur based curing agents. A typical grip recipe includes but is not limited to rubber, thermoplastic or thermoset resin, crosslinker such as peroxide, zinc oxide, zinc diacrylate, clay, sulfur based vulcanizing agents, stearic acid, zinc stearate, and carbon black. This formulation can also have thermochromic pigment. This pigment can be incorporated in its pure or master batch form. In masterbatch form, the carrier can be any of the polymers mentioned above. Even though rubber formulation is more common, thermoplastic or cast polyurethane can also be used for making this grip.

Thermochromic paint used as primer—This is the first layer of paint that goes on top of the last layer of grip. This paint is made by mixing above thermochromic pigment into a paint used for GCGs. This paint can be a two component polyurethane, one component polyurethane dispersion, or one component acrylic emulsion based. The term component is used for number of parts that need to be mixed for applying paint. This paint can be either water or solvent based. Concentration of thermochromic pigment can be anywhere from 0.5% to 60%. Although higher concentration is theoretically possible, it is not desired due to stability and cost concerns.

Thermochromic paint used as topcoat—This is the second layer of paint that goes on top of the primer. This paint is made by mixing above thermochromic pigment into a paint used for GCGs. This paint can be a two component polyurethane, one component polyurethane, one component acrylic emulsion based. The term component is used for number of parts that need to be mixed for applying paint. This paint can be either water or solvent based. Concentration of thermochromic pigment can be anywhere from 0.5% to 60%. Although higher concentration is theoretically possible, it is not desired due to stability and cost concerns.

Thermochromic ink that is used for printing on last layer of grip, or primer, or topcoat. This ink is made by mixing thermochromic pigment with printing ink. This ink can be cured by UV light, heat, or simple air drying. This ink can be one, two or multiple components based.

Metallic or pearlescent pigments-paints or rubber materials used in this invention can optionally also have metallic and or pearlescent pigments to add a luster to the grip. If these pigments are used underneath the top layer, a metallic appearance can be imparted to the areas that are touched by user.

FIG. 1 depicts various components used in making such GCG.

FIG. 1 illustrates a cross-sectional view of golf club grip with a steel or graphite shaft 15, an inner layer 16 of the grip made of rubber, an outer layer 17 of the grip made of rubber, a primer layer 18 of paint applied to the grip, and a topcoat layer 19 of paint.

Figure 2:
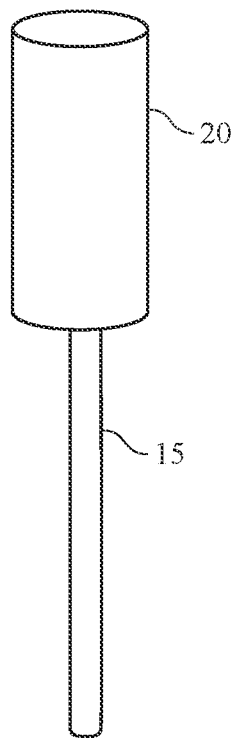
FIG. 2 is a side view of a grip on a shaft.

FIG. 2 is a side view of the golf club grip 20 on a steel or graphite shaft 15.

Even though FIG. 1 shows round GCG; square, elliptical, and other shapes known to an average golfer are also possible to make. Preferable length, diameter, and core size of grip include but is not limited to 8-12 inches, 1-2 inches, and 0.2-2 inches respectively.

Figure 3A:
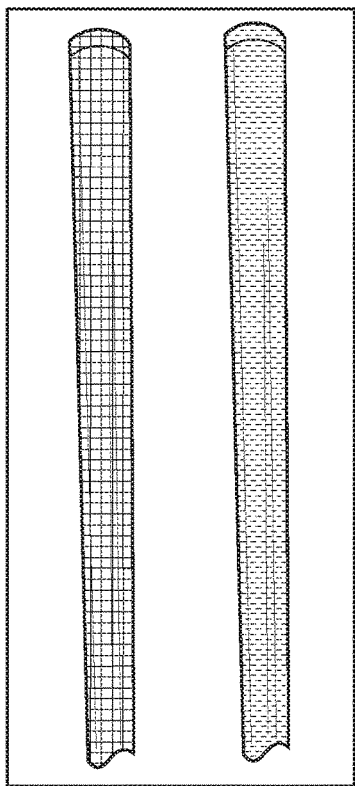
FIG. 3A illustrates a metallic primer applied to GCG which was then top coated with red polyurethane paint.
Figure 3B:
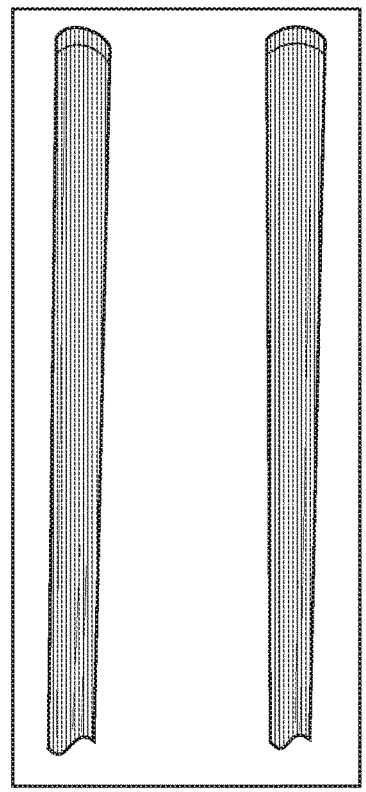
FIG. 3B illustrates red paint contained thermochromic pigment on a grip that could change the color from red to yellow at 28 C.
Figure 3C:
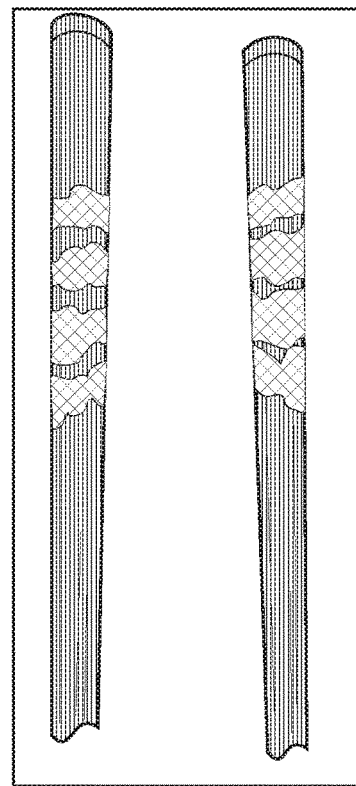
FIG. 3C illustrates hand impressions are generated due to heat from a user's hands.

An illustrative example of present invention is shown in FIGS. 3A, 3B and 3C. This is based on use of thermochromic pigment in top paint layer. FIG. 3A shows a metallic primer applied to GCG which was then top coated with red polyurethane paint (FIG. 3B). This red paint contained thermochromic pigment that could change the color from red to yellow at 28 C. Once this topcoat was cured, it was held with both hands. As seen in FIG. 3C, hand impressions are generated due to heat from a user's hands. This can be a very useful tool to demonstrate the right way to hold a GCG.

FIG. 3A is a GCG painted with metallic primer, FIG. 3B is a red color polyurethane paint applied to this primer, and FIG. 3C illustrates that once the paint is dry, hand touched areas can be seen.

A quick feedback to a golfer regarding how he/she is holding the club grip

Multiple attractive color change features can be imparted to golf grip. These changes include appearance of a color that is completely different from the top layer before it gets touched by a user. A metallic luster can also be imparted to the grip by incorporating metallic or pearlescent pigments in the layers underneath.

The thermochromic pigment preferably changes color upon exposure to a temperature ranging from 0 degrees Celsius to 50 degrees Celsius. The thermochromic paint in the primer layer preferably comprises from 0.5% to 60% of the thermochromic pigment. The inner layer is preferably composed of rubber and a thermochromic pigment. The thermochromic paint in the topcoat layer preferably comprises from 0.5% to 60% of the thermochromic pigment. A metallic luster is preferably imparted in the grip.

Figure 4:
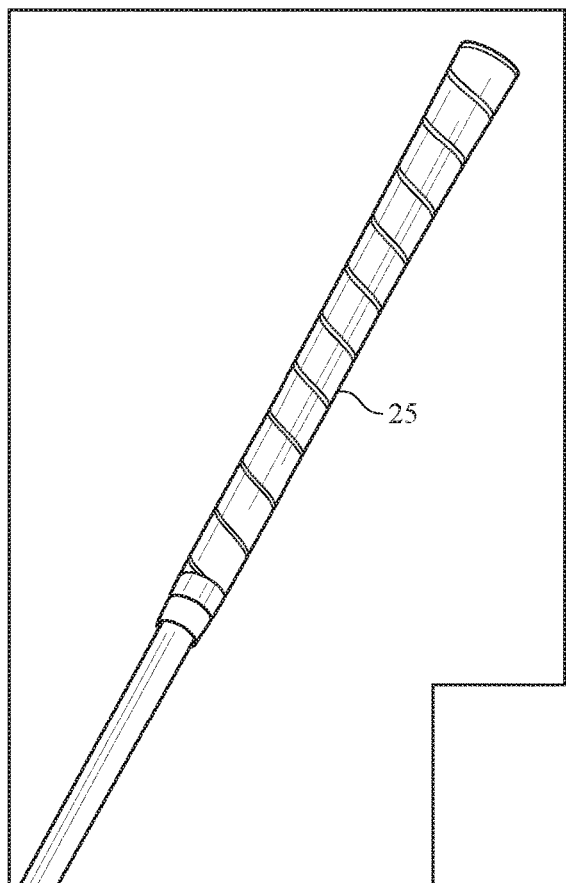
FIG. 4 illustrates a grip on a shaft.
Figure 4A:
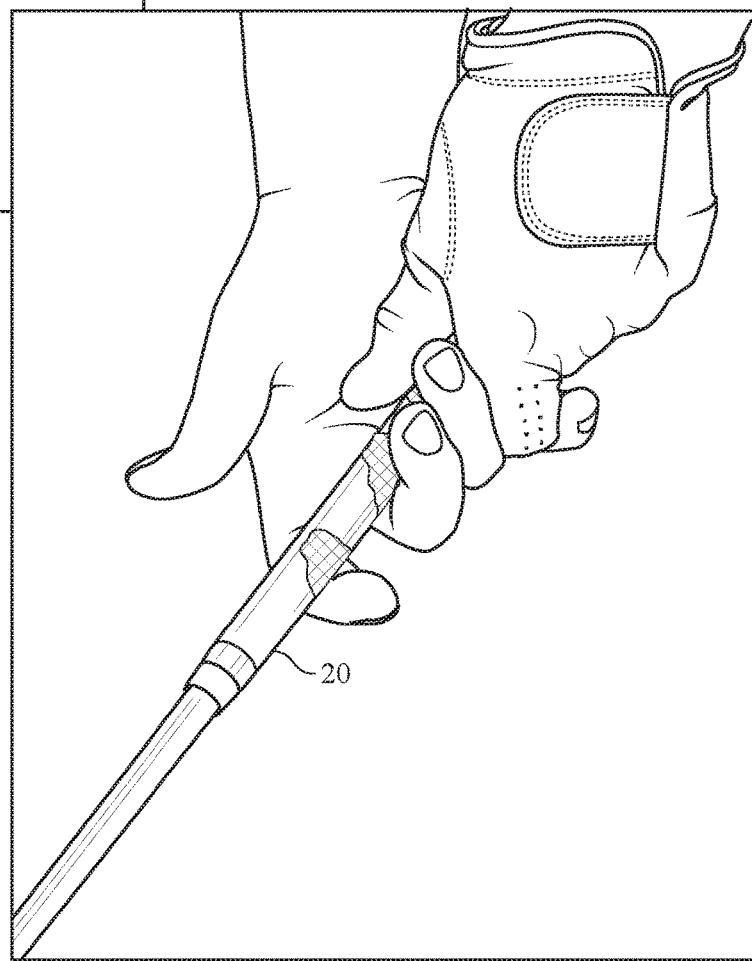
FIG. 4A illustrates a golfer gripping a grip.

FIG. 4 illustrates a grip 25 on a shaft. FIG. 4A illustrates a golfer gripping a grip 20.

In other embodiments, a golf club head may have a multi-material composition such as any of those disclosed in U.S. Pat. Nos. 6,244,976, 6,332,847, 6,386,990, 6,406,378, 6,440,008, 6,471,604, 6,491,592, 6,527,650, 6,565,452, 6,575,845, 6,478,692, 6,582,323, 6,508,978, 6,592,466, 6,602,149, 6,607,452, 6,612,398, 6,663,504, 6,669,578, 6,739,982, 6,758,763, 6,860,824, 6,994,637, 7,025,692, 7,070,517, 7,112,148, 7,118,493, 7,121,957, 7,125,344, 7,128,661, 7,163,470, 7,226,366, 7,252,600, 7,258,631, 7,314,418, 7,320,646, 7,387,577, 7,396,296, 7,402,112, 7,407,448, 7,413,520, 7,431,667, 7,438,647, 7,455,598, 7,476,161, 7,491,134, 7,497,787, 7,549,935, 7,578,751, 7,717,807, 7,749,096, and 7,749,097, the disclosure of each of which is hereby incorporated in its entirety herein.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

I claim as my invention the following:

1. A grip for a golf club, the grip comprising:
   an inner layer defining an aperture configured for attachment to a golf club, the inner layer composed of a rubber;
   an outer layer surrounding to the inner layer, the outer layer composed of a rubber;
   a primer layer applied to the outer layer, the primer layer comprising from 0.5% to 60% of a thermochromic pigment, a polyurethane dispersion component and an acrylic emulsion component; and
   a topcoat layer applied to the primer layer;
   wherein the thermochromic pigment changes color upon exposure to a temperature ranging from 0 degrees Celsius to 50 degrees Celsius.

2. The grip according to claim 1 wherein a metallic luster is imparted in the grip.

3. A grip for a golf club, the grip comprising:
   an inner layer defining an aperture configured for attachment to a golf club, the inner layer composed of a rubber;

an outer layer surrounding to the inner layer, the outer layer composed of a rubber;

a primer layer applied to the outer layer, the primer layer comprising from 0.5% to 60% of a thermochromic pigment, a polyurethane dispersion component and an acrylic emulsion component; and a topcoat layer applied to the primer layer;

wherein the thermochromic pigment changes color upon exposure to a temperature ranging from 0 degrees Celsius to 50 degrees Celsius;

wherein the grip has a length ranging from 8 to 12 inches;

wherein the grip has a diameter ranging from 1-2 inches.

4. A golf club comprising:

a club head;

a shaft attached to the club head on a tip end of the shaft;

a grip attached to the shaft on a butt end of the shaft, the grip comprising an inner layer defining an aperture configured for attachment to a golf club, the inner layer composed of a rubber, an outer layer surrounding to the inner layer, the outer layer composed of a rubber, a primer layer applied to the outer layer, the primer layer comprising from 0.5% to 60% of a thermochromic pigment, a polyurethane dispersion component and an acrylic emulsion component, and a topcoat layer applied to the primer layer;

wherein the thermochromic pigment changes color upon exposure to a temperature ranging from 0 degrees Celsius to 50 degrees Celsius;

wherein the grip has a length ranging from 8 to 12 inches;

wherein the grip has a diameter ranging from 1-2 inches.

\* \* \* \* \*